3,642,682
LACQUERS CONTAINING GUANAMINE-BASED POLYIMIDE RESINS
Gerald G. Vincent, Barrington, and Thomas E. Anderson, Palatine, Ill., assignors to DeSoto, Inc., Des Plaines, Ill.
No Drawing. Filed Dec. 13, 1968, Ser. No. 783,768
Int. Cl. C08g 20/32, 51/34, 51/44
U.S. Cl. 260—30.4 N                    10 Claims

ABSTRACT OF THE DISCLOSURE

Organic solvent-soluble polyimides are provided based on guanamine compounds such as benzoguanamine which are reacted with a stoichiometric proportion of a tetracarboxylic acid dianhydride such as pyromellitic dianhydride. Solubility of the polymer is maintained despite extensive imidization.

---

The present invention relates to polyimide lacquers and to special polyimides which have sufficient solubility in polar organic solvents to permit lacquer application of high temperature-resistant coatings, though utility in adhesives and laminates is also contemplated.

Polyimides are a class of polymers generally prepared by the reaction of a dianhydride with a diamine to form a polyamic acid which is then heated to cyclize and form the polyimide. The chemical changes taking place during the sequence of reactions are shown below:

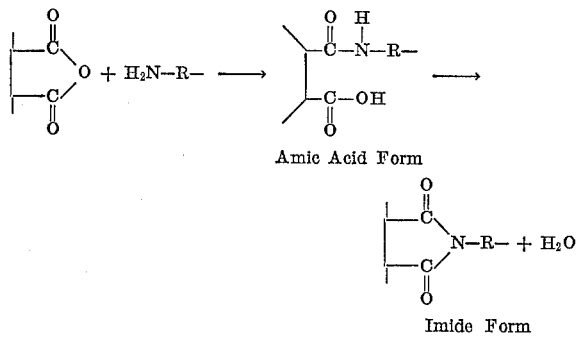

The types of anhydrides and diamines most frequently used for obtaining polyimides are the aromatic dianhydrides such as pyromellitic dianhydride and aromatic diamines such as diamino-diphenyl ether.

The polyamic acids obtained in the first step of the previous reaction sequence are generally soluble in highly polar solvents such as dimethyl formamide, dimethyl acetamide, N-methyl pyrollidone, etc. However, when solutions of these conventional polyamic acids in these solvents are heated, the acids cyclize and form the polyimide which is quite insoluble in these solvents.

The only solvents which have been suggested for dissolving the polyimides are either concentrated sulfuric acid or fuming nitric acid.

In the invention it has been found that when a guanamine is selected as the diamine, this unexpectedly results in polymers containing a substantial number of imide groups, but which are, nonetheless, soluble in solvents such as dimethyl formamide, dimethyl acetamide, N-methyl pyrollidone, butyrolactone, etc. The solubility of this type of polyimide seems to depend upon the use of a guanamine such as benzoguanamine as the diamine, since selection of any of the conventional dianhydrides, e.g., pyromellitic dianhydride or benzophenone tetracarboxylic acid dianhydride, in preparing the polymers does not destroy the aforesaid solubility. Polyimides prepared from conventional polyamic acids for example, have a stability problem which is apparently related to the reduced solubility caused by imidization and the water formed by the imidization of the polyamic acid during storage. Furthermore, the necessity of using polyamic acids means that a large amount of water must be lost during the conversion to the polyimide form and this release of water can cause considerable problems, especially when attempting to cast thicker sections.

While any tetracarboxylic acid dianhydride can be used in this invention, those usually used in the production of polyamic acids convertible to polyimides are preferred. This class of dianhydride is well known and is illustrated by aromatic dianhydrides such as pyromellitic dianhydride.

The guanamine compounds are preferably illustrated by benzoguanamine, but acetoguanamine, tetrahydrobenzoguanamine and endoguanamine will further illustrate the class of compounds which can be used.

The polar solvents which may be used alone or in combination are dimethyl formamide, dimethyl acetamide, N-methyl pyrollidone, butyrolactone, and the like. Ketones such as cyclohexanone are slow-acting, but these form good diluents or cosolvents. Other useful ketones are cyclopentanone and pentanedione. Dimethyl sulfoxide and alpha-tetralone are also useful solvents.

Appropriate molar proportions of guanamine and dianhydride are approximately stoichiometric, e.g., from 1.25:1 to 1:1.25.

The reaction is preferably carried out in solution in organic solvent at a temperature in excess of about 50° C., preferably 60–200° C. N-methyl pyrollidone is a particularly preferred solvent since it leads to the formation of polymers of highest molecular weight.

A typical reaction in accordance with this invention is as follows: Benzoguanamine (2.4 diamino-6-phenyl-s-triazine) (36.8 g.) was added to a flamed out flask containing 150 cc. of N-methyl pyrollidone under a nitrogen blanket. This solution was heated with stirring to 75° C. for a period of 30 minutes. Following this period of time, 63.34 g. of 3,3′,4,4′- benzophenone tetracarboxylic acid dianhydride was added and the reaction takes place rapidly, e.g., less than 1 hour. Higher temperatures and longer reaction condition may be used if desired. A 2 hour reaction at 75° C. is typical of preferred operation. During the reaction a quantity of water is generated and is taken up by the solvent. This release of water from the polymer prior to final baking reduces the amount of water which must be removed during the final bake after the bulk of the solvents have been removed by vaporization.

The polymeric product can be precipitated from solution if desired by adding water or non-solvent organic liquid such as benzene or methanol and the like.

Solutions adapted for spray application are particularly contemplated and this is conveniently achieved by preparing the polymer in solution in the polar solvent at a solids content of from 10–50%, preferably from 20–35% by weight and then diluting to typical spray viscosity, e.g., 20 seconds in a #4 Ford Cup, using cyclohexanone as diluent or cosolvent.

The following examples will illustrate the procedures necessary for obtaining these types of soluble polyamides.

EXAMPLE 1

The benzoguanamine used in the preparation was dried under vacuo for 4 hours at 70° C. This monomer (32.85 g.) was charged to a flamed out flask under nitrogen purge. The N-methyl pyrollidone solvent was distilled, dried with a molecular sieve and 125 ml. of it charged to the reactor. The resultant slurry was stirred at a temperature of 75° C. until a clear solution was obtained. An equimolar quantity of benzophenone tetracarboxylic acid dianhydride (56.6 g.) was added to the flask over a 15–30 minute period and the last trace of the dianhydride rinsed into the flask with 15 ml. of N-methyl pyrollidone. The flask was maintained at 75° C. for 1–1½ hours. After this time it was allowed to cool to room temperature under constant stirring, yielding a dark reddish colored viscous solution.

A solution for spray application is provided by diluting the resin solution to 15% solids with cyclohexanone and the solution sprayed on metal panels at a spray pressure of 80 p.s.i.

The acid number of the polymer solids should theoretically be 220. However, the actual acid number is only about 121 indicating extensive imidization has occurred. These solutions are remarkably stable on prolonged storage. Loss of at least 30% theoretical acidity in imide formation is indicative of operation in accordance with this invention.

EXAMPLE 2

This example was conducted in the same manner and under the same conditions as the first example except that 15.2 g. of acetoguanamine were reacted with 39.2 g. of benzophenone tetracarboxylic acid dianhydride in 125 ml. of N-methyl-pyrollidone.

EXAMPLE 3

This example was also conducted in a manner similar to Example 1 except that 24.6 g. of tetrahydrobenzoguanamine were reacted with 41.5 g. of benzophenone tetracarboxylic acid dianhydride in 145 ml. of N-methyl pyrollidone.

Coating solutions of any of the previously described resins may include dimethyl formamide, dimethyl acetamide, N-methyl pyrollidone or butyrolactone and these active solvents, alone or in admixture with one another, may be diluted with cyclohexanone. The cyclohexanone to other solvents ratio in the final solution is desirably about 3:1 and the polymer solids in the solution is desirably about 10–20% by weight.

The polymer was evaluated by using typical drawdowns, although the solution viscosity is also adequate for spraying. These solutions are preferably sprayed at higher than usual spray pressure, e.g., about 80 p.s.i. These solutions may be pigmented if desired.

Metal panels, e.g., aluminum panels, coated using the solution of Example 1 can be cured by baking the same for 8 hours at 500° F. The coatings could be cured more rapidly, but this schedule was utilized to insure removal of all of the solvent component, and to demonstrate the excellent heat resistance of the products since this vigorous schedule did not injure the coating. Surface defects from excessive release of water are not encountered.

The cured films are insoluble in hydraulic fluids and also in typical organic solvents used in coating technology such as methyl ethyl ketone and xylene. Highly polar organic solvents such as those used herein (N-methyl-pyrollidone) will dissolve the baked product despite its being substantially entirely in the polyimide form, e.g., having an acid number of around 5. Thus, the baked coatings are still soluble in dimethyl formamide, dimethyl acetamide and the other solvents referred to herein so that, unlike conventional polyimide coatings, the coatings of this invention are subject to solvent stripping.

The cured films are quite hard, e.g., exhibiting a pencil hardness of 5H or harder.

The invention is defined in the claims which follow.

We claim:

1. Polyimide of a tetracarboxylic acid dianhydride and a guanamine selected from benzoguanamine, acetoguanamine, tetrahydrobenzoguanamine and endoguanamine, said polyimide containing said dianhydride and said guanamine in molar proportions of from 1.25:1 to 1:1.25 and being soluble in organic solvent of the group of dimethyl formamide, dimethyl acetamide, N-methyl pyrollidone and butyrolactone.

2. Polyimide polymer as recited in claim 1 in which the polymer is prepared by reacting said dianhydride with said guanamine in solution in polar organic solvent comprising a member of the group of dimethyl formamide, dimethyl acetamide, N-methyl pyrollidone, butyrolactone, dimethyl sulfoxide, and alpha-tetralone, the reaction being carried out at a temperature in excess of about 50° C. until at least 30% of the theoretical acidity has been lost.

3. Polyimide polymer as recited in claim 1 in which said dianhydride is aromatic.

4. Polyimide polymer as recited in claim 3 in which said dianhydride is pyromellitic dianhydride.

5. Polyimide polymer as recited in claim 2 in which said organic solvent comprises N-methyl pyrollidone.

6. Polyimide polymer as recited in claim 2 in which said reaction temperature is about 75° C.

7. A lacquer comprising the polymer of claim 1 in solution in a polar organic solvent selected from the group of dimethyl formamide, dimethyl acetamide, N-methyl pyrollidone and butyrolactone.

8. A lacquer as recited in claim 7 in which said solvent is used in admixture with cyclohexanone.

9. A coated product comprising a metal substrate coated with a baked film of the lacquer recited in claim 7.

10. Polyimide as recited in claim 1 containing approximately stoichiometric proportions of said dianhydride and benzoguanamine.

No references cited.

MORRIS LIEBMAN, Primary Examiner

R. ZAITLEN, Assistant Examiner

U.S. Cl. X.R.

260—30.2, 32.6 N, 78 TF